United States Patent [19]
Terrell

[11] 3,904,697
[45] Sept. 9, 1975

[54] 1-BROMO-2,2,2-TRIFLUOROETHYL DIFLUOROMETHYL ETHER

[75] Inventor: Ross C. Terrell, Plainfield, N.J.

[73] Assignee: Airco, Inc., Montvale, N.J.

[22] Filed: May 7, 1973

[21] Appl. No.: 358,209

Related U.S. Application Data

[62] Division of Ser. No. 139,862, May 3, 1971, Pat. No. 3,764,705.

[52] U.S. Cl............................................. 260/614 F
[51] Int. Cl.².......................................... C07C 43/00
[58] Field of Search................................ 260/614 F

[56] References Cited
UNITED STATES PATENTS
3,449,504   6/1969   Terrell............................. 260/614 F

FOREIGN PATENTS OR APPLICATIONS
1,814,962   8/1969   Germany......................... 260/614 F

OTHER PUBLICATIONS

Croix et al., C.A. 72, (1970), 3004b.

Larsen, Fluorine Chemistry Reviews, Vol. 3 (1969), 38–39.

*Primary Examiner*—Howard T. Mars
*Attorney, Agent, or Firm*—Roger M. Rathbun; Edmund W. Bopp; H. Hume Mathews

[57] ABSTRACT

The novel compound 1-bromo-2,2,2-trifluoroethyl difluoromethyl ether having the formula $CF_3CHBr-O-CHF_2$ is prepared through bromination of 2,2,2-trifluoroethyl difluoromethyl ether. The brominated compound is useful as an inhalation anesthetic and as a solvent and dispersant for fluorinated materials.

1 Claim, No Drawings

1-BROMO-2,2,2-TRIFLUOROETHYL DIFLUOROMETHYL ETHER

This is a division of application Ser. No. 139,862, filed May 3, 1971, now Pat. No. 3,764,705, issued Oct. 9, 1973.

This invention relates to the compound 1-bromo-2,2,2-trifluoroethyl difluoromethyl ether and its use in producing anesthesia in anesthetic-susceptible, air-breathing mammals.

The compound 1-bromo-2,2,2-trifluorethyl difluoromethyl ether has the following formula:

$$CF_3CHBr-O-CHF_2$$

This ether is normally a clear, colorless liquid with a not unpleasant odor, and has the following physical properties: boiling point 64.5°C.; vapor pressure 175 mm. at 25°C.; specific gravity 1.9; refractive index $N_D^{20}$ 1.3297 and molecular weight 229. The compound is nonflammable, soda lime stable, and a potent anesthetic for anesthetic-susceptible mammals. This ether is also easily miscible with other organic liquids including fats and oils and has useful solvent properties, for example, as a solvent for fluorinated olefins and other fluorinated materials such as fluoro waxes. The compound may be used to prepare pastes and dispersions of such materials useful for coatings and the like and may be used as a degreasing agent.

The compound 1-bromo-2,2,2-trifluoroethyl difluoromethyl ether can be prepared by brominating 2,2,2-trifluoroethyl difluoromethyl ether, i.e. $CF_3CH_2OCHF_2$, whose preparation is described in U.S. Pat. No. 3,535,425. The bromination can be carried out at temperatures of about 425° to 500°C., and best results are usually found at about 450° to 475°C. Following the bromination the reaction mass can be separated by fractional distillation or by vapor phase chromatography.

The following example will illustrate the preparation of 1-bromo-2,2,2trifluoroethyl difluoromethyl ether. The feed ether, $CF_3CH_2-O-CHF_2$ (76 g.), was charged to a bubbler. Nitrogen at 5-10 liters per hour, was passed through the bubbler and into another bubbler containing bromine. The resulting ether and bromine-containing gas stream was then passed through a 1 × 12 glass tube maintained at 450°C. by an electrical heater. The product was collected in a trap at −78°C. After six hours, 73 grams of 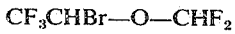 and 41 g. of bromine had been reacted. The product was recovered by distillation and preparative gas chromatography, bp. 64.5°C., $N_D^{20}$ 1.3297.

Calculated Formulation $C_3H_2BrF_5O$ : C,15.7: H, 0.87; Found: C,16.0; H, 0.89

The desired compound was further identified by infra-red spectra.

In order to determine the potency of 1-bromo-2,2,2-trifluoroethyl difluoromethyl ether as an inhalation anesthetic in combination with oxygen, tests were carried out on mice. The 1-bromo-2,2,2-trifluoroethyl difluoromethyl ether used was at least 99.5% pure as determined by vapor phase chromatography.

In the tests, groups of five mice were placed into a jar and exposed to a concentration of 0.5 to 2.5% by volume of 1-bromo-2,2,2-trifluoroethyl difluoromethyl ether. After an induction time which was free of excitation, the mice were anesthetized and then recovered. The results of these pharmacologic tests were as follows:

| No. of Animals Tested | Inhal. Conc. | Induc. Time | Recovery Time | Remarks |
|---|---|---|---|---|
| 5 | 0.5% | 4m.*40s.** | 1m.40s. to pain[1] 26s. to walking | Smooth induction Very light anesthesia. Rapid, complete recovery. |
| 10 | 1.0% | 58s. | 57s. to pain 1m.40s. to walk | Uneventful. |
| 10 | 1.5% | 27s. | 1m.52s. to pain 3m.6s. to walk | Quick smooth induction. Resp. depression to rate 32 in maint. Complete recovery fast. |
| 5 | 2.5% | 20s. | 7m.31s. to pain 7m.29s. to walk | Ditto. |

*m = minutes
**s = seconds
[1]Tail clip test - reaction to pain created by a tail clip These tests show that 1-bromo-2,2,2-trifluoroethyl difluoromethyl ether is a potent anesthesia agent which is rapidly taken up and excreted by warm-blooded mammals. This anesthetic produced muscle flaccidity during maintenance, and, in high concentrations caused marked respiratory depression which did not persist into the recovery period. The anesthetized animals recovered rapidly and appeared fully alert. In comparison with the 1-chloro-2,2,2-trifluoroethyl difluoromethyl ether anesthetic agent of my U.S. Pat. No. 3,535,425 the anesthesia of the present invention gives comparable induction times in lesser concentrations. Thus with mice, 2.5% of the agent of my prior patent gave an induction time of 30 seconds which was accomplished with only 1.5% of the anesthesia of this invention.

The anesthetic agent of the invention may be administered by any of the well known techniques used for the administration of general inhalation agents, such as the open drop, semiclosed, and closed systems. The agent may also be administered as an injectable anesthetic as taught by John C. Krantz, Jr. in U.S. Pat. No. 3,216,897 issued November 9, 1965, and assigned to the assignee of the instant application.

The compound 1-bromo-2,2,2-trifluoroethyl difluoromethyl ether exhibits excellent anesthetic properties. The compound is non-flammable and soda lime stable. It lends itself to effective use as an inhalent anesthetic in respirable mixtures containing life-supporting concentrations of oxygen as well as mixtures containing oxygen and other inhalation anesthetics such as nitrous oxide. The effective amount of $CF_3CHBr-O-CHF_2$ to be employed depends on the level of anesthesia to which the mammal is to be brought, the rate at which anesthesia is to be induced, and the length of time over which anesthesia is to be maintained. Volume percentages of $CF_3CHBr-O-CHF_2$ in oxygen from a fraction of a percent, e.g. 0.1 to 0.25%, up to several percent, e.g. about 10%, can be employed. The amount of anesthesia to be used can be easily regulated, starting with a small amount of the ether and gradually increasing the amount until the desired plane of anesthesia is reached. By then monitoring the physical reactions of the mammal, as is the usual procedure, the duration and plane of anesthesia can be readily controlled.

While there has been described what are at present considered to be the preferred embodiments of the invention, it will be understood that various modifications may be made therein which are within the true spirit and scope of the invention.

I claim:

1. The compound 1-bromo-2,2,2-trifluoroethyl difluoromethyl ether of the formula $CF_3CHBr-O-CHF_2$.

* * * * *